(12) United States Patent
Anthony

(10) Patent No.: US 6,456,758 B1
(45) Date of Patent: Sep. 24, 2002

(54) CHIP FOR SEPARATING LIGHT INTO DIFFERENT WAVELENGTHS

(75) Inventor: Philip J. Anthony, Milpitas, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/578,796

(22) Filed: May 23, 2000

(51) Int. Cl.[7] .......................... G02B 6/26; H01S 3/100; H04J 14/02
(52) U.S. Cl. .................... 385/27; 385/27; 385/28; 385/37; 385/39; 385/72; 385/73; 372/23; 372/64; 372/102; 359/127; 359/130
(58) Field of Search ........................ 385/72, 73, 37, 385/27, 28, 39; 372/23, 102, 64; 359/127, 130

(56) References Cited

U.S. PATENT DOCUMENTS

| | | | | |
|---|---|---|---|---|
| 5,440,416 A | * | 8/1995 | Cohen et al. | 359/127 |
| 5,913,000 A | * | 6/1999 | Doerr et al. | 385/46 |
| 5,946,331 A | * | 8/1999 | Amersfoort et al. | 372/23 |
| 6,243,514 B1 | * | 6/2001 | Thompson | 385/27 |

* cited by examiner

*Primary Examiner*—Georgia Epps
*Assistant Examiner*—M. Hasan
(74) *Attorney, Agent, or Firm*—Lacasse & Associates, LLP

(57) ABSTRACT

The invention provides a chip for separating light into different wavelengths. The chip includes a substrate, an input waveguide, an optical arrangement, and a plurality of output waveguides. The substrate has first and second edge sections. The input waveguide is formed on the substrate and has an end for providing light thereto located at the first edge section. The input waveguide extends from the first end thereof in a first direction. The optical arrangement receives the light from the input waveguide and separates the light into a pattern of light of different wavelengths. The output waveguides are formed on the substrate. Each output waveguide receives light of a respective wavelength from the optical arrangement and transmits the light. Each output waveguide has an end, from which the light is transmitted, located at the second edge section. Each output waveguide extends to the second end thereof in a second direction. The second direction is different from the first direction.

12 Claims, 3 Drawing Sheets

CHIP FOR SEPARATING LIGHT INTO DIFFERENT WAVELENGTHS

BACKGROUND OF THE INVENTION

1). Field of the Invention

This invention relates to a chip for separating light into different wavelengths, it's fabrication and implementation.

2). Discussion of Related Art

An optical fiber is often used for transmitting light signals over long distances. Light of different wavelengths can be mixed and transmitted through a single optical fiber. For purposes of signal processing, it may be necessary to separate the light into different wavelengths at a receiving end. Many devices have been developed for separating light into different wavelengths. One such device is described in U.S. Pat. No. 5,913,000.

SUMMARY OF THE INVENTION

The invention provides a chip for separating light into different wavelengths. The chip includes a substrate, an input waveguide, an optical arrangement, and a plurality of output waveguides. The substrate has first and second edge sections. The input waveguide is formed on the substrate and has an end for providing light thereto located at the first edge section. The input waveguide extends from the first end thereof in a first direction. The optical arrangement receives the light from the input waveguide and separates the light into a pattern of light of different wavelengths. The output waveguides are formed on the substrate. Each output waveguide receives light of a respective wavelength from the optical arrangement and transmits the light. Each output waveguide has an end, from which the light is transmitted, located at the second edge section. Each output waveguide extends to the second end thereof in a second direction. The second direction is different from the first direction. The second direction may be at an angle of at least 90° with respect to the first direction.

BRIEF DESCRIPTION OF THE DRAWINGS

The invention is further described by way of example with reference to the accompanying drawings wherein.

DETAILED DESCRIPTION OF THE INVENTION

Figure 1:
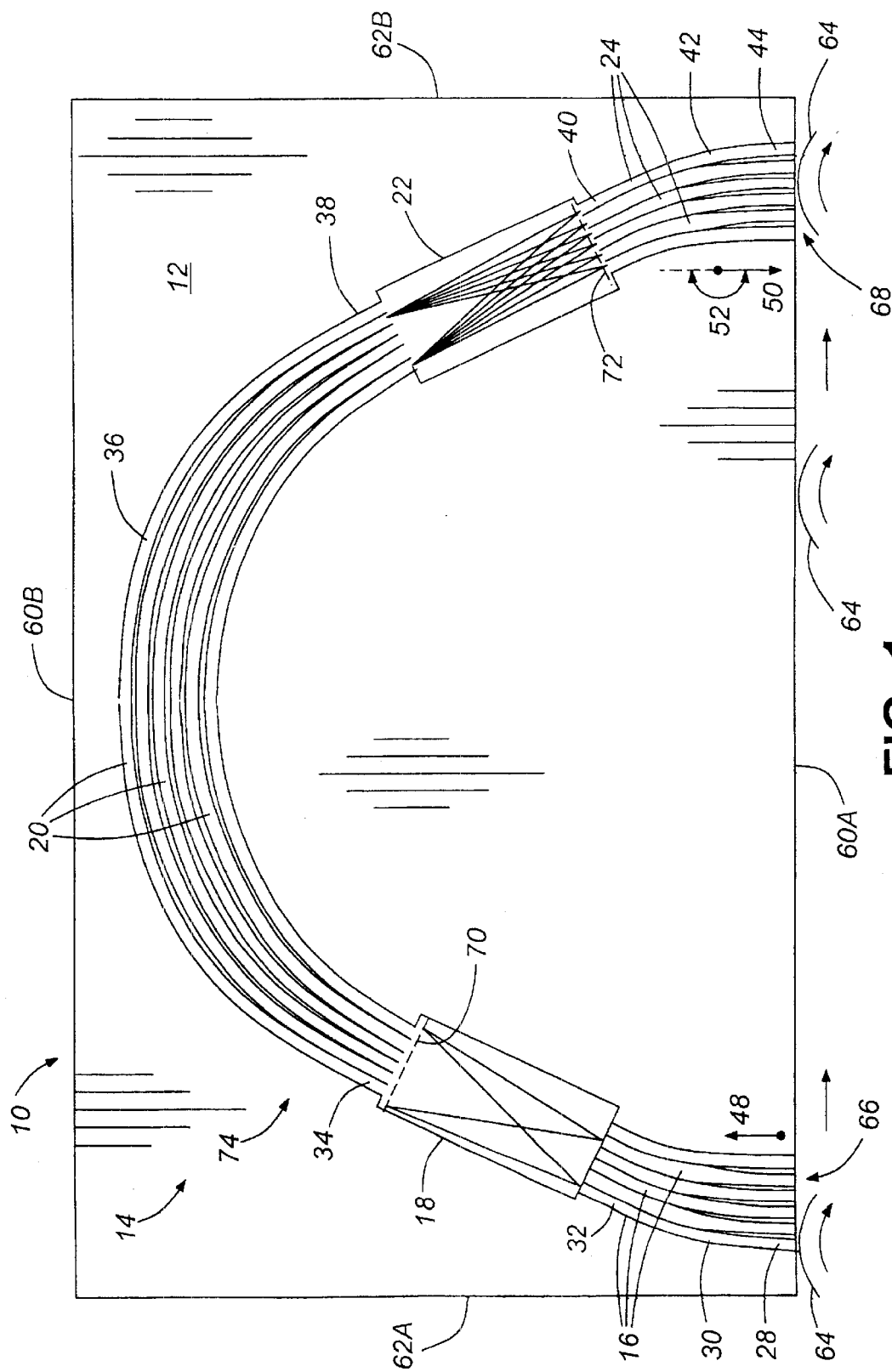
FIG. 1 is a top plan view of a chip for separating a light into different wavelengths according to an embodiment of the invention.

FIG. 1 of the accompanying drawings illustrates a chip 10 for separating a light into different wavelengths. The chip includes a substrate 12 on which an optical structure 14 is formed. The optical structure 14 may be made of silicon dioxide or another material through which light can be channeled. The optical material is deposited on the substrate and etched to leave a plurality of input waveguides 16, a primary coupling section 18, a plurality of grating waveguides 20, a secondary coupling section 22, and a plurality of output waveguides 24.

Each input waveguide 16 has a first end 28, a length 30, and a second end 32. The second ends 32 of the input waveguides 16 terminate against the primary coupling section 18. Each grating waveguide 20 has a first end 34 originating on a side of the primary coupling section 18 opposing the input waveguides 16, a length 36, and a second end 38. The grating waveguides 20 are curved so that outer ones of the grating waveguides 20 have longer lengths 38 than inner ones of the grating waveguides 20. The second ends 38 of the grating waveguides 20 terminate against one side of the secondary coupling section 22.

Each output waveguide 24 has a first end 40 originating at a side of the secondary coupling section 22 opposing the grating waveguide 20, a length 42, and a second end 44.

The input waveguides 16 extend in a first direction 48 from the first ends 28 thereof. The output waveguides 24 extend in a second direction 50 to the second ends 44 thereof. The second direction 50 is different from the first direction 48 by an angle 52 of about 180°.

Figure 2:
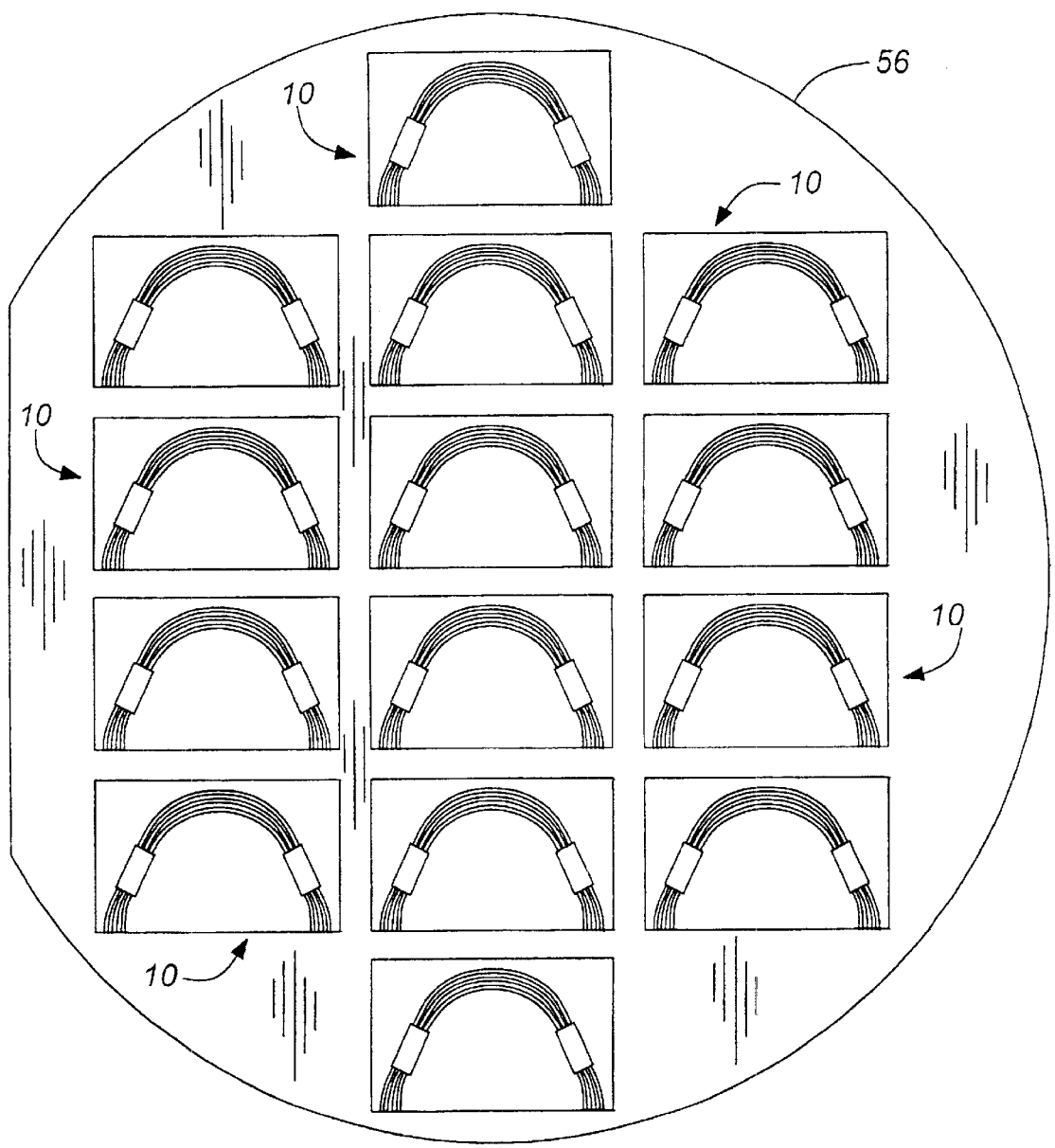
FIG. 2 is a top plan view of a wafer on which a plurality of such chips are manufactured.

Referring briefly to FIG. 2, a plurality of the chips 10 are manufactured on a wafer 56. Each optical structure 14 has a generally "U"-shape because the first and second directions 48 and 50 oppose one another. A "U"-shape allows for a smaller chip 10 to be made and, accordingly, a higher packing density of chips 10 on the wafer 56. The chips 10 are separated from one another in a subsequent sawing operation. Referring again to FIG. 1, each chip 10 has a rectangular shape with two opposing long edges 60A and 60B and two opposing short edges 62A and 62B. The first end 28 of the input waveguides 16 and the second ends 44 of the output waveguides 24 are all located in line on one of the long edges 60A.

The long edge 60A with the ends 28 and 44 thereon is subsequently polished by a polishing surface of a polisher 64. The polisher 64 moves over a first edge section 66 to polish the ends 28 and then along the edge 60A and then over a second edge section 68 of the edge 60A where the ends 44 are located. Both edge sections 66 and 68 are polished in a single polishing operation wherein the polisher 64 moves in a straight line along the edge 60A. Because only the edge 60A has to be polished, polishing efficiency is increased. Moreover, because the polisher 64 moves in a straight line, there is more uniformity of polishing between the first edge section 66 and the second edge section 68. It may also be possible that a defect will occur when the first edge section 66 is polished, with a corresponding effect on how the optical structure 14 functions. The defect will however be duplicated on the second edge section 68 and the effect on how the optical structure 14 functions due to the defect of the first edge section 66 may be canceled by the defect at the second edge section 68.

In use, light can be provided to the first end 28 of one of the input waveguides 16 and be transmitted through the length 30 to the second end 32 of the input waveguide 16. The light is then diffused from the second end 32 of the input waveguide 16 through the primary coupling section 18 over a wider dispersion area 70. The light then enters the first end 34 of each grating waveguide 20 and transmits through the length 36 of the grating waveguides 20 to the second ends 38 thereof. The light then radiates and disperses from the second ends 38 through the secondary coupling section 22 over a wider interference area 72. Because of differences in the lengths 36 of the grating waveguides 20, an interference pattern of light of different wavelengths is created over the interference area 72. The first ends 40 of the output waveguides are located at different locations of the interference area 72 so that light of a respective wavelength is provided thereto. Light of a respective wavelength transmits through the length 72 of each output waveguide 24 to the second ends 44 of the output waveguides 24. The primary coupling section 18, the grating waveguides 20, and the secondary coupling section 22 thus form an optical arrangement 74 which separates light provided to one of the input waveguides 16 into light of different wavelengths which is provided to the output waveguides 24. Further details of how the chip 10 functions are detailed in U.S. Pat. No. 5,913,000 which is hereby incorporated by reference.

Figure 3:
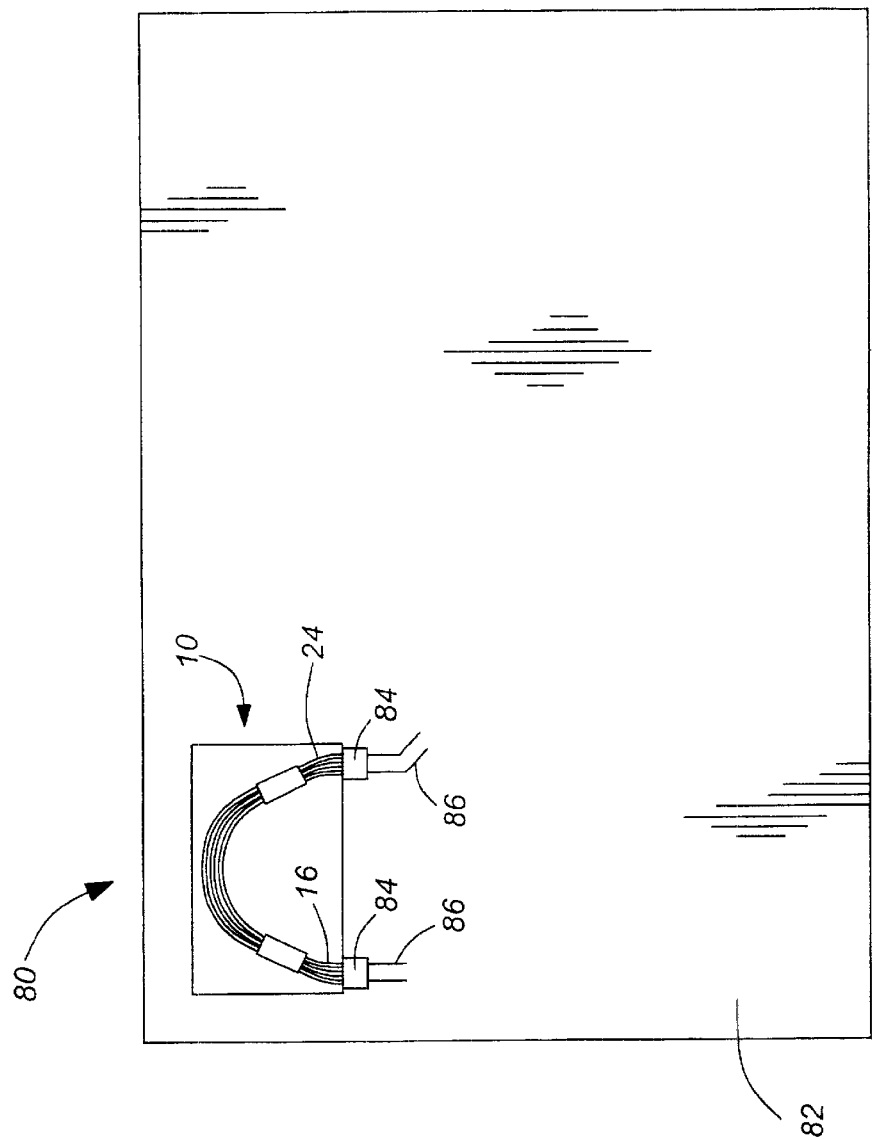
FIG. 3 is a top plan view of a circuit board layout including a printed circuit board with the chip of FIG. 1 located in a corner of the printed circuit board.

FIG. 3 illustrates a circuit board layout 80 including a printed circuit board 82 and the chip 10 of FIG. 1. Optical couplings 84 are connected to the input and output waveguides 16 and 24. Optical fiber leads 86 extend from the coupling 84. The chip 10 is located at a corner of the printed circuit board 82. The location of the chip 10 is made possible because the input and output waveguides 16 and 24 do not terminate at opposing edges of the chip 10. Although there are distinct advantages for locating terminating ends of the input and output waveguides 16 and 24 on a single straight edge, it should be understood that another arrangement may also be possible wherein the angle (see reference numeral 52 in FIG. 1) is not necessarily 180°. For example, the angle may be about 90° and terminating ends of input and output waveguides 16 and 24 maybe located on edges which are at right angles to one another. Such a chip would still fit into a corner of a printed circuit board.

While certain exemplary embodiments have been described and shown in the accompanying drawings, it s to be understood that such embodiments are merely illustrative and not restrictive of the current invention, and that this invention is not restricted to the specific constructions and arrangements shown and described since modifications may occur to those ordinarily skilled in the art.

What is claimed is:

1. A chip for separating light into different wavelengths, comprising:
   a substrate having first and second edge sections;
   an input waveguide, on the substrate, having an end for providing light thereto located at the first edge section, the input waveguide extending from the end thereof in a first direction;
   an optical arrangement which receives the light form the input waveguide and separating the light into a pattern of light of different wavelengths; and
   a plurality of output waveguides, on the substrate, each receiving light of a respective wavelength from the optical arrangement and transmitting the light, each having an end, from which the light is transmitted, located at the second edge section, and each extending to the end thereof in a second direction which is different from the first direction, wherein the second direction is at an angle of at least 90° with respect to the first direction.

2. A chip according to claim 1 wherein the second direction is opposite to the first direction.

3. A chip according to claim 1 wherein the second direction is about 180° with respect to the first direction.

4. A chip according to claim 1 wherein the first and second edge sections have an orientation relative to one another other than substantially parallel and spaced.

5. A chip according to claim 1 wherein the first and second edge sections both fall and extend in a single line.

6. A chip for separating light into different wavelengths, comprising:
   a substrate having first and second edge sections;
   an input waveguide, on the substrate, having a first end for providing input light thereto, the first end being located a the first edge section, a length through which the light transmits, and a second end thereof in a first direction;
   a primary coupling section, on the substrate, into which the light from the input waveguide radiates and disperses through the primary coupling section over a wider dispersion area;
   a plurality of grating waveguides, on the substrate, each having a first end at a different location of the dispersion area for providing the dispersed light thereto, a length through which the light transmits, and a second end from which the light radiates;
   a secondary coupling section, on the substrate, into which light from each grating waveguide radiates and disperses through the secondary coupling section over a wider interference area, the grating waveguides having different lengths so that an interference pattern of light of different wavelengths is created over the interference area; and
   a plurality of output waveguides, on the substrate, each having a first end located at a different location of the interference area so that light of a respective wavelength is provided thereto, a length through which the light transmits, and a second end from which the light is transmitted, the second end being located at the second edge section, the output waveguide extending to the second end thereof in a second direction which is different from the first direction wherein the second direction is at an angle of at least 90° with respect to the first direction.

7. A chip according to claim 6 wherein the second direction is opposite to the first direction.

8. A chip according to claim 6 wherein the second direction is about 180° with respect to the first direction.

9. A chip according to claim 6 wherein the first and second edge sections have an orientation relative to one another other than substantially parallel and spaced.

10. A chip according to claim 6 wherein the first and second edge sections both fall in a single line.

11. A method for making a chip for separating light into different wavelengths, comprising:
    forming an input waveguide, a primary coupling section, a plurality of grating waveguides, a secondary coupling section, and a plurality of output waveguides on a wafer;
    severing the wafer into a substrate having a first and second edge sections which are both located in a single line, the input waveguide having a first end for providing input light thereto, the first end being located at the first edge section, a length through which the light transmits, and a second end from which the light radiates, the input waveguide extending from the first end thereof in a first direction, light from the input waveguide radiating into the primary coupling section and dispersing through the primary coupling section over a wider dispersion area, each grating waveguide having a first end at a different location of the dispersion area for providing the dispersed light thereto, a length through which the light transmits, and a second end from which the light radiates, light from each grating waveguide radiating into the secondary coupling section and dispersing through the secondary coupling section over a wider interference area, the grating waveguides having different lengths so that an interference pattern of light of different wavelengths is created over the interference area, each output waveguide having a first end located at a different location of the interference area so that light of a respective wavelength is provided thereto, a length through which the light transmits, and a second end from which the light is transmitted, the second end being located at the second edge section; and polishing the first and second edge sections along the line.

12. A method according to claim 11 wherein the first and second edge sections are both polished with the same polisher without the polisher leaving the substrate.

* * * * *